Lawther & Letz,
Piston Meter,
N° 58,843. Patented Oct. 16, 1866.
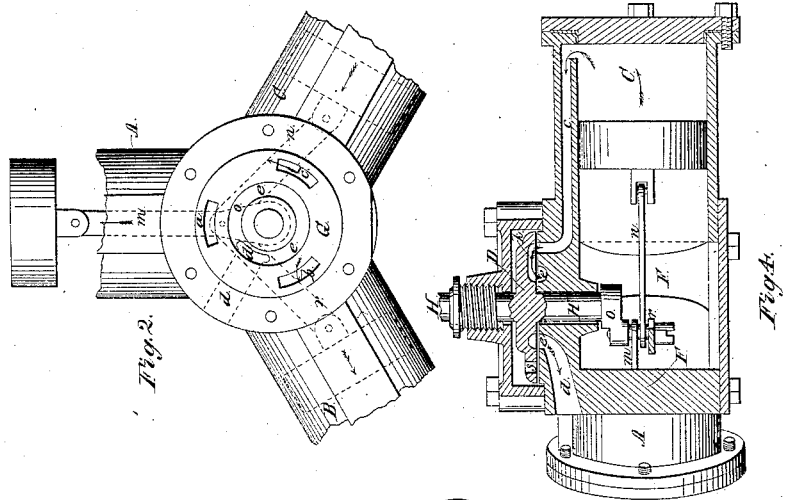
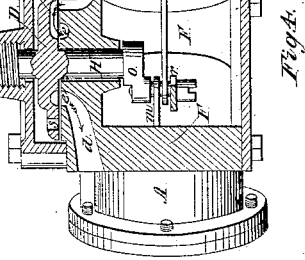
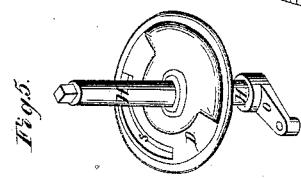
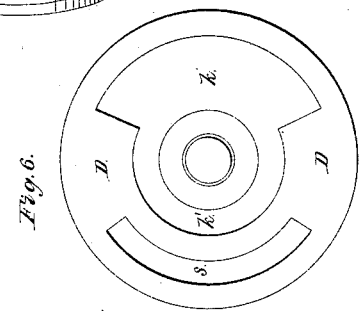
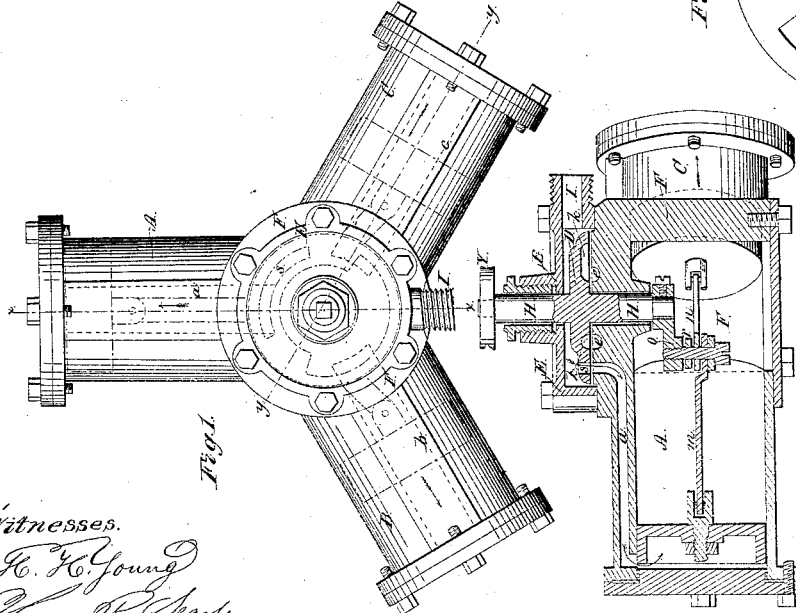
Witnesses.
H. H. Young
Henry R. Searle
Inventor.
A. B. Lawther
& George F. Letz
David A. Burr
Atty

UNITED STATES PATENT OFFICE.

ALFRED B. LAWTHER AND GEORGE F. LETZ, OF CHICAGO, ILLINOIS.

IMPROVEMENT IN WATER METERS AND MOTORS.

Specification forming part of Letters Patent No. 58,843, dated October 16, 1866.

*To all whom it may concern:*

Be it known that we, ALFRED B. LAWTHER and GEORGE F. LETZ, of Chicago, in the county of Cook and State of Illinois, have invented a new and Improved Water Meter and Motor; and we do hereby declare the following to be a full and clear description thereof, reference being had to the accompanying drawings, in which—

Figure 1 is a top view of the meter, with its rotary valve and the pistons and rods illustrated in red lines, and the conduits to the cylinders in dotted lines; Fig. 2, a plan of the meter with the water-dome and rotary valve removed, showing the plate covering the water-chamber and the openings into the cylinder-conduits therein, with the pistons and piston-rods indicated by dotted lines. Fig. 3 is a vertical section through the cylinder A, in the line $x\ x$ of Fig. 1, showing the piston thrown back to the outer end of the cylinder, with the valve in that position in which communication is opened for the inflow of water into the cylinder; Fig. 4, a similar section through the cylinder C, in the line $y\ y$, Fig. 1, showing the piston moving outwardly and the communication through the valve and conduit opened for the outflow of the water; Fig. 5, a perspective view of the rotary valve and its shaft detached; Fig. 6, a bottom view of said valve, showing the slot and water-channels therein.

Similar letters indicate like parts in each of the drawings.

The nature of our invention consists in the combination of three or more single-acting pistons, moving in cylinders radiating from a common center, with a central crank secured to a rotary valve, regulating the flow and reflow of water into and from the rear ends of said cylinders. This rotary valve allows the water under pressure to enter successively each cylinder in the rear of its piston, to force the same inwardly, and then cutting off the inflowing water when the cylinder is full, immediately opening an outward communication for its efflux, thus permitting the return of the pistons. Hence at each revolution of the crank the several cylinders are each once filled and emptied of water, which is thus accurately measured in its flow through the apparatus.

The apparatus consists of three cylinders, A B C, of equal length and diameter, projecting radially at equal intervals from a central circular chamber, F, whose diameter is somewhat greater than that of said cylinders. This central circular chamber, F, Figs. 3 and 4, as well as its three radiating cylinders, A B C, is made water-tight; but water conduits or passages $a\ b\ c$, Figs. 3 and 4, and dotted lines, Fig. 1, are formed upon the surface of each cylinder, so as to open inwardly into the outer extremity of each cylinder, (see $a$, Fig. 3, and $c$, Fig. 4,) and outwardly through the exterior surface of the plate G, covering the central chamber, F, as seen in Fig. 2. This covering-plate G is provided with an annular groove or channel, $e$, formed upon its exterior surface, and an aperture, $d$, Fig. 4, and dotted lines, Fig. 2, is so pierced or formed through the plate as to supply an open communication outwardly from the annular groove $e$ to a suitable discharge-pipe secured upon the outside of the chamber.

The conduits leading to the extremities of the cylinders extend centrally through the covering-plate G to within a short distance of the outer edge of the annular groove $e$ thereon, without, however, connecting or opening into said groove $e$.

A circular valve, D, Fig. 5, is placed upon this plate G of the central circular chamber, F, of the apparatus, so as to revolve freely thereon, and yet make a water-tight joint therewith. This valve D is attached to a central vertical shaft, H, which projects inwardly through the plate G into the chamber F, as seen in Figs. 3 and 4.

A curved slot, $s$, Fig. 6 and in red, Fig. 1, embracing an arc of about one-third of the circumference of the top plate, is cut entirely through the valve D. From the length of this slot it is evident that it must always be in register with the mouth or opening into at least one of the cylinder-conduits, thus leaving a free communication open between the outside of the valve D and the inner end of that cylinder. (See, for example, cylinder A, Fig. 3.)

Immediately opposite to the slot $s$, and upon a corresponding arc of equal length, an arched or extended recess, $k$, Fig. 6, is formed upon the inner side of the valve D, of such a width as to spring from the inner rim of the annular groove in the exterior surface of the plate G far enough to cover the mouth or openings into the conduits to the cylinders, as seen in Figs. 1, 3, and 4, so that when in register with any one of said openings, as seen in Fig. 4, it shall provide a communication between the same and the discharge-pipe of the apparatus through the groove or channel $e$. This groove or channel $e$ is perfected between the valve and plate by continuing the recess $k$ in the valve in a complete circle, $k'$, therein, but of a radius or diameter so much smaller than at $k$ as simply to cover or correspond with the groove $e$, without extending over it, as seen in Figs. 1 and 2. This circular rotating valve D is inclosed within and under a circular water-tight dome or cover, E, Figs. 3 and 4, resting upon the cover of the central chamber of the apparatus, and a supply-pipe, I, Fig. 3, is fitted to said dome, for the introduction of water therein. The valve D is kept down in place upon the plate G by the pressure of the water thereon.

A crank, $o$, somewhat shorter than the radius of the chamber F, is secured to the inner end of the valve-shaft H, within the central circular chamber, F. Three arms or links, $m$ $n$ $r$, of equal length, (see dotted lines, Fig. 2,) are pivoted to said crank, extending thence to pistons playing within each cylinder. The length of these arms or links $m$ $n$ $r$ is such as that when the crank is in a right line with the axis of any one cylinder, as of A, Fig. 3, and dotted lines, Fig. 2, the piston at the end of said arm or link will be pushed back to the outer end of said cylinder.

The operation of the apparatus is as follows: Water being introduced under pressure through the supply-pipe I, Figs. 1 and 3, into the space under the dome E and over the rotating valve D, it will rush through the slot $s$ therein into the conduit or passage whose mouth may at the moment be uncovered thereby, as $d$, in Figs. 1 and 3. (See the arrows.) Passing through said conduit, it will enter the cylinder (see B, Fig. 1) behind the piston therein, and by its pressure force the same inwardly. This inward movement of the piston will be transmitted by means of its link to the crank on the shaft, and will thus cause the valve to rotate sufficiently to form a communication for the water into the next cylinder, as at A, Figs. 1 and 3, so that its pressure shall be exerted also upon the piston therein, forcing that also in the next place inwardly, thereby continuing the rotary movement of the crank $o$, shaft H, and valve D after the first piston has been forced in to the entire depth of its cylinder. Thus, by successively uncovering the openings into the conduits $a$ $b$ $c$, the water is allowed to flow through the same with full pressure into each cylinder successively, in the rear of its piston, until the piston is forced in so far as is possible, when the continued movement of the valve covers and closes the opening. (See Fig. 4.) In the meantime the under portion, $k$, of the arched recess upon the inner side of the valve D opens a communication between the conduit of the cylinder whose piston is being forced outwardly by the movements of the other pistons, as at $c$, Fig. 4, and dotted lines, Fig. 1, and the discharge-pipe of the apparatus, through the annular groove $e$ in the covering-plate G of the central chamber, thus allowing the water in said cylinder to flow freely out of the same.

It will be observed, from the length of both the curved slot and the wide portion $k$ of the arched recess, that there will be a constant flow into one, as A, and out of another cylinder, as C, at the same time, and consequently a flow and reflow into and from each cylinder in succession.

A suitable indicator, Y, upon the upper end of the shaft, indicates the number of its revolutions, and as, at each revolution, all three of the cylinders are once filled and emptied, an exact measure of the quantity of water passing through the apparatus is obtained.

By substituting gearing for the indicator, power may be obtained from the machine.

Having thus fully described our improved water-meter, we claim therein as our invention and desire to secure by Letters Patent—

1. Three or more cylinders radiating from a central chamber, inclosing pistons connected with a central crank secured to a rotary valve, or its equivalent, operating to regulate the flow of water to and from said cylinders, substantially in the manner and for the purpose herein set forth.

2. Three or more single-acting pistons, when so combined with a central crank as to operate a rotary valve, and thus regulate and control a flow of water under pressure against said pistons, substantially in the manner and for the purpose herein set forth.

The foregoing specification of our improved water meter and motor signed by us this 30th day of December, A. D. 1865.

A. B. LAWTHER.
GEO. F. LETZ.

In presence of—
JAS. H. MORRIS,
A. D. STURTEVANT.